United States Patent
Liu (10) Patent No.: US 8,588,550 B2
(45) Date of Patent: *Nov. 19, 2013

(54) VIRTUAL LEVEL FOR A DIGITAL CAMERA

(75) Inventor: Ming-Chang Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 638 days.

This patent is subject to a terminal disclaimer.

(21) Appl. No.: 12/897,556

(22) Filed: Oct. 4, 2010

(65) Prior Publication Data

US 2012/0081402 A1   Apr. 5, 2012

(51) Int. Cl.
*G06K 9/46* (2006.01)
*G06T 7/00* (2006.01)
*G03B 17/20* (2006.01)

(52) U.S. Cl.
USPC ............. 382/289; 382/199; 382/202; 396/50; 396/281

(58) Field of Classification Search
USPC ..................... 382/289, 199, 202; 396/50, 281
See application file for complete search history.

(56) References Cited

U.S. PATENT DOCUMENTS

| 8,411,161 B2* | 4/2013 | Yu et al. ..................... 348/222.1 |
| 2006/0204232 A1* | 9/2006 | Weinberg et al. ............... 396/50 |
| 2010/0128131 A1* | 5/2010 | Tenchio et al. ............ 348/207.1 |

* cited by examiner

*Primary Examiner* — Jon Chang
(74) *Attorney, Agent, or Firm* — Haverstock & Owens LLP (57) ABSTRACT

A method of and apparatus for generating a reference line or a virtual level enables tilt correction of an image. A user is able to utilize the reference line to see how an image should be oriented for the objects within the image to be level. The user is able to then correct the tilt of the image as desired using the reference line for assistance.

22 Claims, 6 Drawing Sheets

VIRTUAL LEVEL FOR A DIGITAL CAMERA

FIELD OF THE INVENTION

The present invention relates to the field of image processing. More specifically, the present invention relates to a virtual level for a digital camera.

BACKGROUND OF THE INVENTION

Digital cameras have been used to acquire images for many years. Digital cameras typically record captured images in a particular format on a storage device. The stored images are able to be processed or modified by a user.

Some types of digital cameras include built in orientation sensors. An orientation sensor is used to determine if the user has the camera in regular landscape mode or if the camera has been rotated to take a picture in the portrait mode. The inclusion of the orientation sensor allows the images to be displayed on a display in the correct orientation.

In spite of orientation sensors, it is common to acquire an image with a camera tilted to an angle. In some circumstances, it is beneficial to correct the tilt/angle so that the image appears untilted. One implementation of tilt correction involves identifying vertical or horizontal objects within an image and determining the orientation error associated with the objects and rotating the image to eliminate the orientation error.

SUMMARY OF THE INVENTION

A method of and apparatus for generating a reference line or a virtual level enables tilt correction of an image. A user is able to utilize the reference line which is directly overlaid on top of an existing edge (line) of the image to see how an image should be oriented for the objects within the image to be level. The user is able to then correct the tilt of the image as desired using the reference line for assistance.

In one aspect, a method of assisting a user in orienting an image programmed in a memory on a device comprises estimating a tilt angle and generating a reference line based on the tilt angle. Estimating the tilt angle further comprises computing a gradient feature, implementing line segment tracking, estimating a line segment and estimating an orientation deviation. Computing the gradient feature further comprises estimating a gradient, adaptive noise filtering, non-maximum suppression and thinning. Implementing line segment tracking further comprises locating segment junctions using a neighborhood look-up table and tracking edges between junction points. Tracking edges between junction points further comprises scanning a gradient image starting at a non-zero edge point, following an edge segment through its neighborhood, stopping tracking at a junction, assigning each segment a unique identification, iterating until all of the points are tracked and removing any edge segment that is short or isolated. Estimating the line segment further comprises filtering edge length and estimating linear segments from approximately vertical and horizontal lines. Estimating the orientation deviation further comprises computing an optimal balance between deviations from all line segments. Estimating the orientation deviation further comprises image content analysis and segment analysis. Image content analysis further comprises filtering segments according to location in the image. Segment analysis uses vertical segments if more than one vertical segment is present; otherwise, horizontal segments are used if more than one horizontal segment is present and the total length is more than the total vertical length; otherwise, the average of the vertical and horizontal segment length is used. Generating the reference line includes displaying the reference line on a display of the device. Generating the reference line occurs during image acquisition. Alternatively, generating the reference line occurs after image acquisition. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a method of assisting a user in orienting an image programmed in a memory on a device comprises estimating a tilt angle comprising implementing linear structure estimation for estimating orientation preference and generating a reference line based on the tilt angle. Implementing linear structure estimation further comprises computing a gradient feature, implementing line segment tracking, estimating a line segment and estimating an orientation deviation. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a system programmed in a memory on a device comprises a gradient feature module configured for computing a gradient feature, a line segment tracking module operatively coupled to the gradient feature module, the line segment tracking module configured for implementing line segment tracking, a line segment estimating module operatively coupled to the line segment tracking module, the line segment estimating module configured for estimating a line segment, an orientation deviation module operatively coupled to the line segment estimating module, the orientation deviation module configured for estimating an orientation deviation and a reference line generation module operatively coupled to the orientation deviation module, the reference line generation module configured for generating a reference line based on the orientation deviation. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a device comprises a memory for storing an application, the application configured for estimating a tilt angle and generating a reference line based on the tilt angle and a processing component coupled to the memory, the processing component configured for processing the application. Estimating the tilt angle further comprises computing a gradient feature, implementing line segment tracking, estimating a line segment and estimating an orientation deviation. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a camera comprises a lens, a sensor configured for acquiring an image through the lens, a memory for storing an application, the application configured for estimating a tilt angle comprising computing a gradient feature, implementing line segment tracking, estimating a line segment and estimating an orientation deviation and generating a reference line based on the tilt angle and a processing component coupled to the memory, the processing component configured for processing the application. The reference line is overlaid and displayed on a display to allow a user to correct tilt in the image.

DETAILED DESCRIPTION OF THE PREFERRED EMBODIMENT

A preferred orientation of an object and the deviation of the current orientation from the preferred orientation is determined by tilt image analysis without object recognition. This process is also able to be aided by using a reference line. Tilt image analysis includes several steps such as gradient feature computation, line segment tracking, line segment estimation and orientation deviation estimation. Tilt image analysis is further described in U.S. patent application Ser. No. 12/897,537, filed on Oct. 4, 2010, issued on Apr. 2, 2013 as U.S. Pat. No. 8,411,161 and entitled, APPARATUS FOR AUTOMATIC ESTIMATE OF THE ANGLE IN TILTED IMAGES FOR LEVEL CORRECTION, which is incorporated by reference herein.

Figure 1:
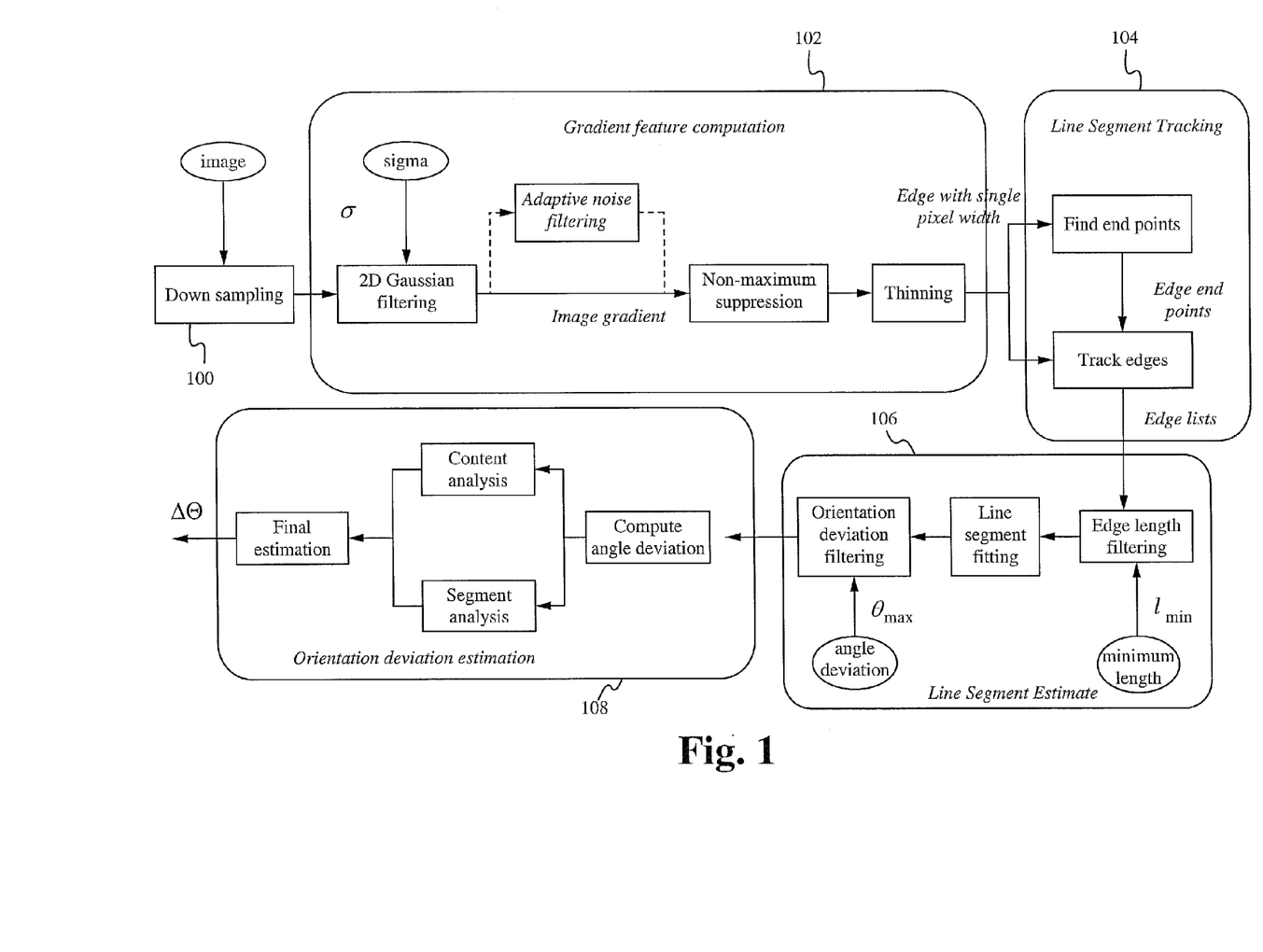
FIG. 1 illustrates a flowchart of a method of estimating a tilt angle of an image according to some embodiments.

FIG. 1 illustrates a flowchart of a method of estimating a tilt angle of an image. In the step 100, the image is down sampled. In some embodiments, down sampling brings the image to a maximum of 600 pixels in either length or width using bicubic interpolation. In some embodiments, a different method of down sampling is implemented. In some embodiments, a different number of maximum pixels is implemented. In some embodiments, the step 100 is skipped, and down sampling is not implemented.

In the step 102, a gradient feature is computed. Computing the gradient feature includes gradient estimation, adaptive noise filtering, non-maximum suppression and thinning. In the gradient estimation a directional derivative of a Guassian is further computed.

$$\left[\frac{\partial G_\sigma}{\partial x}, \frac{\partial G_\sigma}{\partial y}\right], G_\sigma = \frac{1}{\sqrt{2\pi}\,\sigma} e^{-(x^2+y^2)/2\sigma^2}$$

The gradient magnitude is computed by:

$$I_g(x, y) = \left[\left(\frac{\partial G_\sigma}{\partial x} * I\right)^2 + \left(\frac{\partial G_\sigma}{\partial y} * I\right)^2\right]^{1/2}$$

In some embodiments, an edge gradient is filtered by adaptive noise filtering.

The image gradient is further processed by non-maximum suppression. Non-maximum suppression is applied to suppress a pixel whose gradient is not locally a maximum:

$$I_g(x, y) = \begin{cases} I_g(x, y) & \text{if } I_g(x, y) > I_g(x', y') \ \& \ I_g(x, y) > I_g(x'', y'') \\ 0 & \text{otherwise} \end{cases}$$

A pixel is labeled an "edge" if its gradient is above a high threshold. The pixel is labeled as a "non-edge" if its gradient is below a low threshold. For a pixel between the high and low thresholds, the pixel is labeled an "edge" if it is connected with an "edge" pixel.

Thinning is also implemented to estimate a single pixel width from double or triple maximum edge points. After thinning, the edge with a single pixel width is used in the next step.

In the step 104, line segment tracking is implemented. Line segment tracking includes locating segment junctions by a neighborhood look-up table algorithm. Line segment tracking also includes tracking edges between junction points including scanning a gradient image starting at a non-zero edge point, following an edge segment through its neighborhood, stop tracking at the junction, assigning each segment a unique identification, iterating until all of the points are tracked and removing any edge segment that is short or isolated. Resulting edge lists are used in the next step.

In the step 106, a line segment is estimated. Estimating the line segment includes edge length filtering using Euclidean 2-norm. Estimating the line segment also includes estimating linear segments from approximately vertical and horizontal lines by filtering a minimum length ($l > l_{min}$), fitting by straight line segments and considering only lines close to vertical or horizontal orientation ($\theta < \theta_{max}$).

In some embodiments, line segment estimation includes a two-scale method with higher precision but increased complexity. The two-scale method includes edge gradient detection with statistical noise filtering at two levels. At the first level (or level 0), short line segments are identified. At the second level (or level 1), long line segments are searched, cued by the short segments. The orientation deviation is then computed at level 1.

In the step 108, orientation deviation is estimated using the line segments. Orientation deviation estimation includes computing angle deviation where:

$$\delta\theta_i = \begin{cases} \theta_i - \varphi, & |\theta_i - \varphi| \leq \theta_{max} \\ 0, & |\theta_i| > \theta_{max} \end{cases},$$

$$\varphi = 0, \pi/2$$

The optimal balance is computed from the line segments determined in the step 106.

$$\Delta\Theta_{0,\pi/2} = \sum_i w_i \delta\theta_i, \ w_i = \frac{l_i}{\sum_i l_i}$$

Image content analysis filters segments according to their locations in the image. Segments within "ignored" zones along an image boundary do not contribute to the final estimation. Segment analysis uses vertical segments if more than one vertical segment is present.

Otherwise, horizontal segments are used if more than one horizontal segment is present and their total length is more than the total vertical length. Otherwise, the average of the vertical and horizontal segment length is used.

View parameters ΔΘ are estimated from the optimal linear balance:

$$\Delta\Theta = f(d_0, d_{\pi/2}) = \beta_0 \Delta\Theta_0 + \beta_{\pi/2} \Delta\Theta_{\pi/2}$$

where $\beta_0, \beta_{\pi/2}$ are determined by the image content analysis and segment analysis.

In some embodiments, after the view parameters are estimated, the image is rotated by the amount of orientation deviation so that the tilt is removed.

Figure 2:
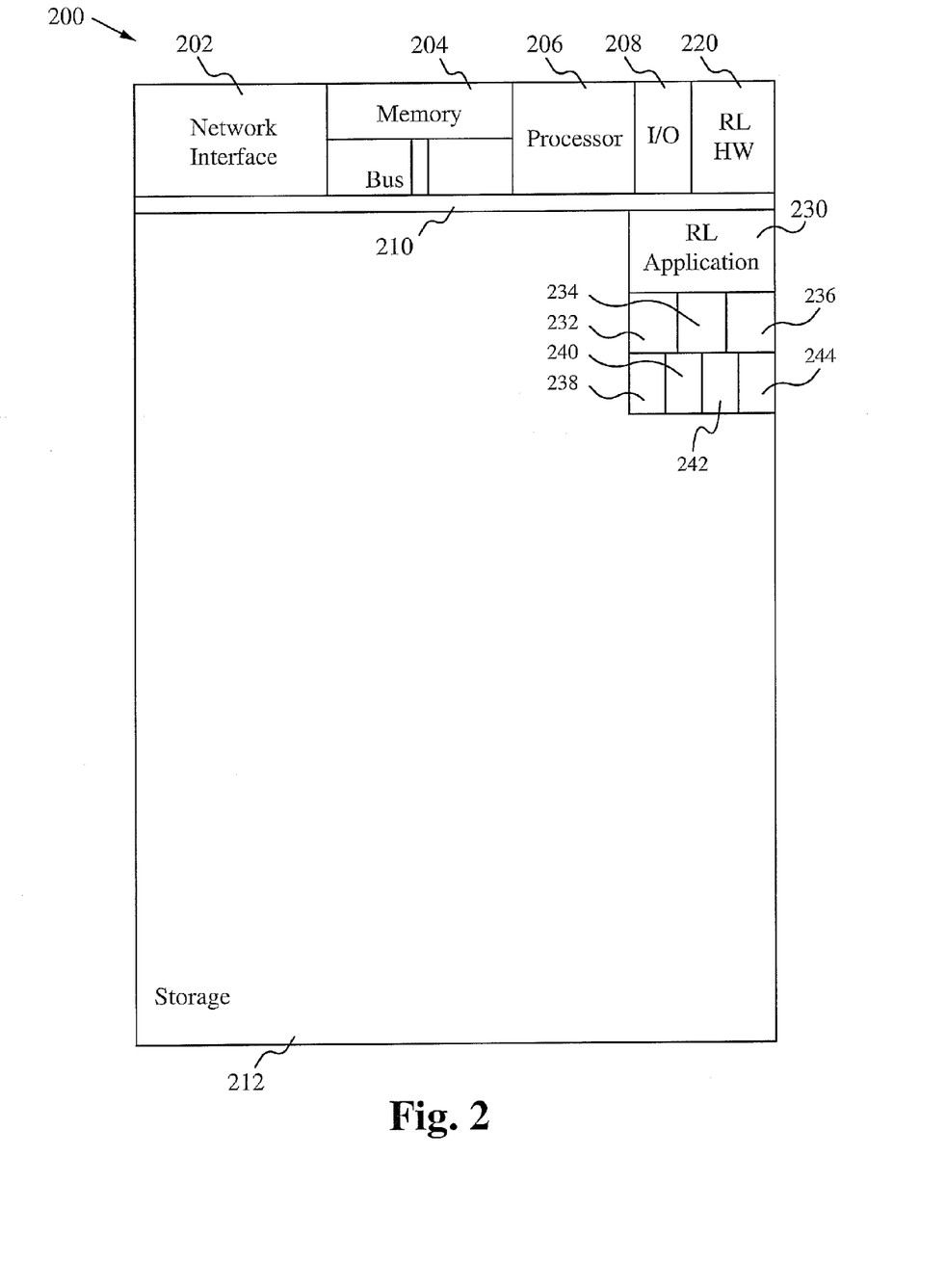
FIG. 2 illustrates a block diagram of an exemplary computing device configured to generate a reference line according to some embodiments.

FIG. 2 illustrates a block diagram of an exemplary computing device 200 configured to generate a reference line (also referred to as a virtual level) according to some embodiments. The computing device 200 is able to be used to acquire, store, compute, communicate and/or display information such as images and videos. For example, a computing device 200 is able to acquire and store an image. The reference line generation method is able to be used to generate a reference line to be used to correct the tilt of the image on the device 200. In general, a hardware structure suitable for implementing the computing device 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, flash memory card or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, button interface and other devices. Tilt angle estimation application(s) 230 used to perform the tilt angle estimation method are likely to be stored in the storage device 212 and memory 204 and processed as applications are typically processed. More or less components shown in FIG. 2 are able to be included in the computing device 200. In some embodiments, reference line generation hardware 220 is included. Although the computing device 200 in FIG. 2 includes applications 230 and hardware 220 for reference line generation, the reference line generation method is able to be implemented on a computing device in hardware, firmware, software or any combination thereof.

In some embodiments, the reference line generation application(s) 230 include several applications and/or modules. In some embodiments, the reference line generation application(s) 230 include tilt angle estimation applications and modules. A gradient feature module 232 is configured for computing a gradient feature. A line segment tracking module 234 is configured for implementing line segment tracking. A line segment estimating module 236 is configured for estimating a line segment. An orientation deviation module 238 is configured for estimating an orientation deviation. A tilt correction module 240 is configured for tilting an image based on the orientation deviation. A planar inference module 242 is configured for implementing planar structure estimation. A reference line generation module 244 is configured for generating a reference line. Fewer or additional modules are able to be included as well.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television, a home entertainment system or any other suitable computing device.

A specific example of a computing device implementing reference line generation is a camera which includes a lens, a sensor such as a Charge-Coupled Device (CCD) or Complementary Metal Oxide Semiconductor (CMOS), a storage component such as a hard drive or a flash memory, a processing component and other standard image acquisition components. The camera functions as any other camera, for example, when a user presses a button to acquire an image, the lens, sensor and processor function together to acquire the desired image. The reference line generation method is able to be used in conjunction with the standard functionality of the camera to ensure that the image has a proper configuration.

Figure 3:
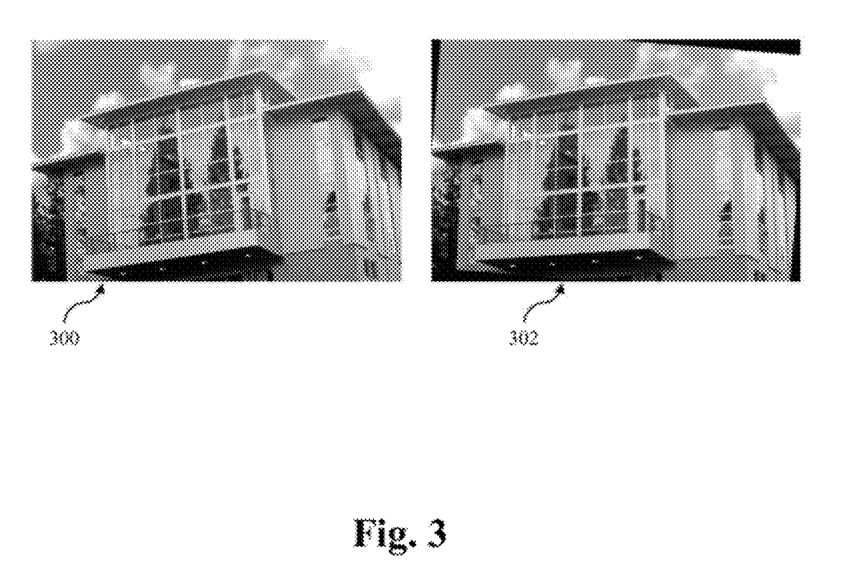
FIG. 3 shows exemplary before and after images with tilt correction according to some embodiments.

FIG. 3 shows exemplary before and after images with tilt correction according to some embodiments. A first image 300 is shown as taken by a user. The first image 300 is tilted with the building, tree and sky at a significant angle. A second image 302 is shown after being corrected for the tilt. The correction shows the building, tree and sky in a configuration that such a scene would generally appear.

Figure 4:
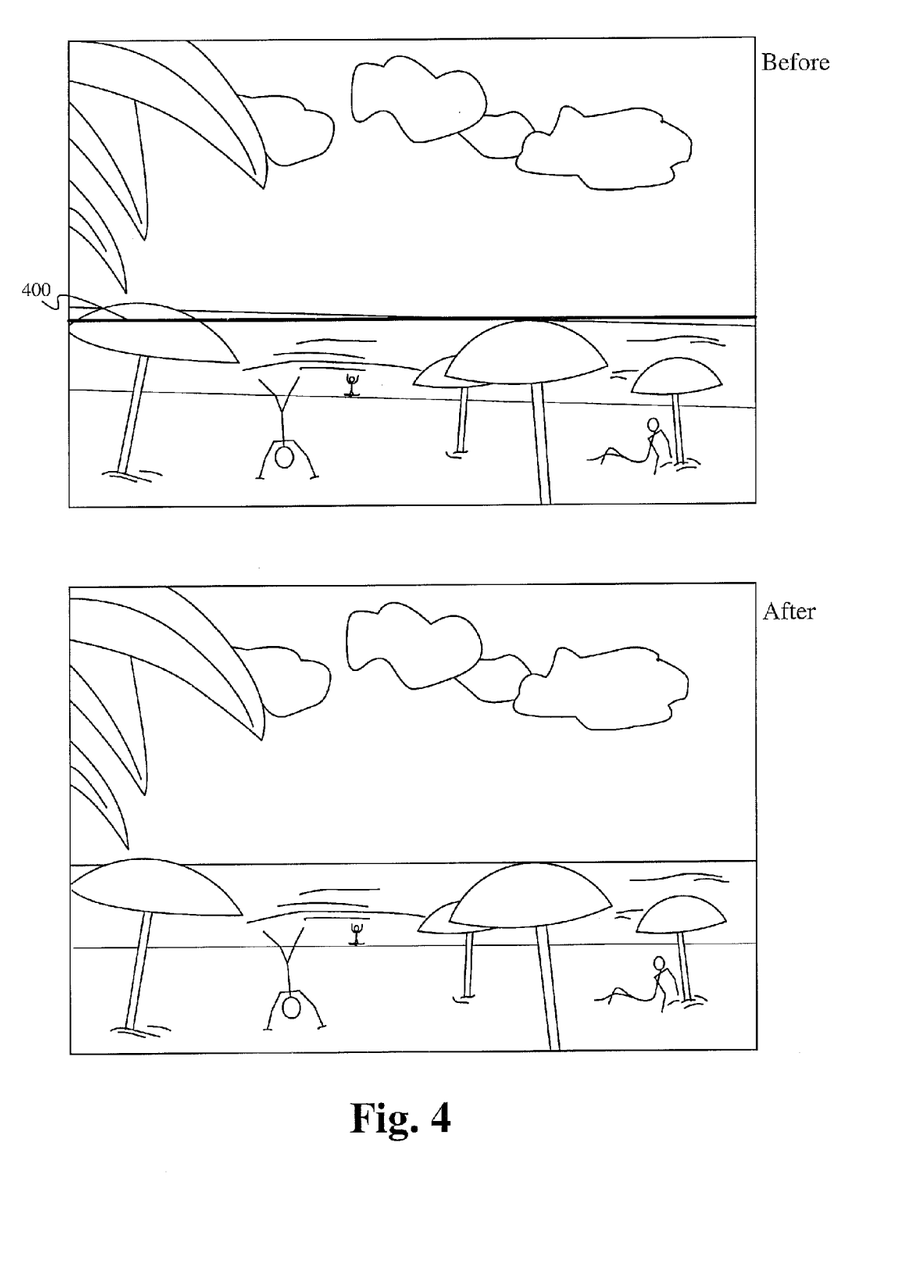
FIG. 4 shows exemplary before and after images with tilt correction using a reference line according to some embodiments.

FIG. 4 shows exemplary before and after images with tilt correction using a reference line according to some embodiments. A device is able to automatically estimate a tilted angle of a scene as described herein. The device is also able to provide a reference line 400 directly overlaying an image or showing on a viewfinder or another display to assist a user. In some embodiments, the reference line 400 is able to be determined using the tilt angle estimation implementation described herein. In some embodiments, the reference line 400 is able to be determined using another implementation. The reference line 400 is able to appear while the photograph is being taken or after the photograph has been taken and when the user is displaying the photograph (e.g. on a camera or in photo editing software). The reference line 400 is able to be utilized in a digital camera so that a user is able to manually correct for the tilt, or the camera is able to automatically correct the level without user involvement. The reference line 400 is displayed partially on or near an object or scene that generally has a similar directionality/position. For example, in FIG. 4, the horizon, where the water meets the sky, the water is generally horizontally across. The reference line 400 is positioned very close to the horizon so that a user is able to line up the horizon with the reference line 400 to correct the tilt of the image. In some embodiments, the reference line 400 includes a quality or feature to distinguish it from the scene in the image. For example, the line is able to be semi-transparent, dotted, dashed, solid, a bright color, a color not found within the image, multi-colored and/or any other quality. The reference line 400 is able to be implemented in any manner, such as in a software module. The reference line 400 shown in FIG. 4 assists in correcting for tilt based on a horizontal line.

Figure 5:
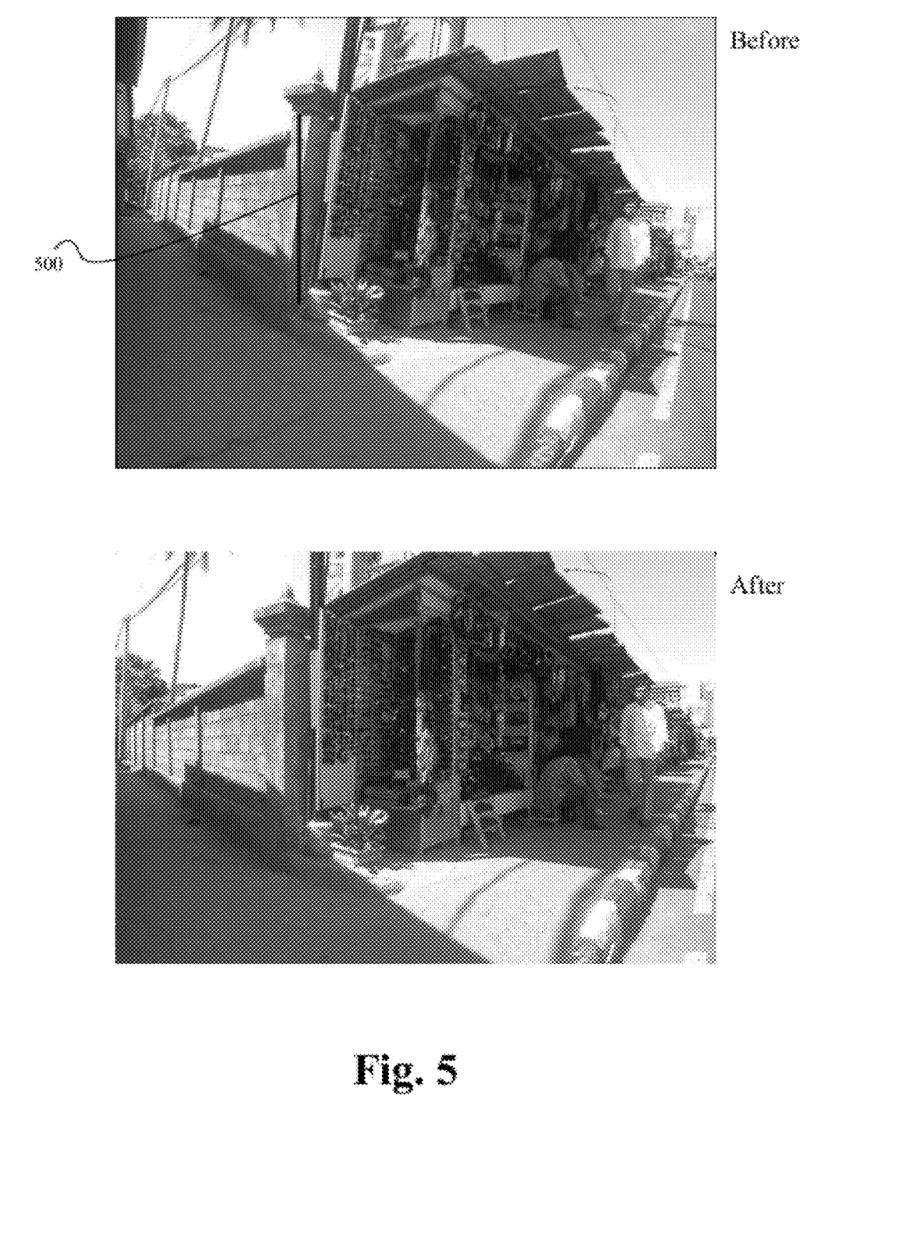
FIG. 5 shows exemplary before and after images with tilt correction using a reference line according to some embodiments.

FIG. 5 shows exemplary before and after images with tilt correction using a reference line according to some embodiments. In addition to being able to place a horizontal reference line 400 as shown in FIG. 4, a vertical reference line 500 is able to be used. For example, in FIG. 5, a reference line 500 is used based on a post in the scene.

Figure 6:
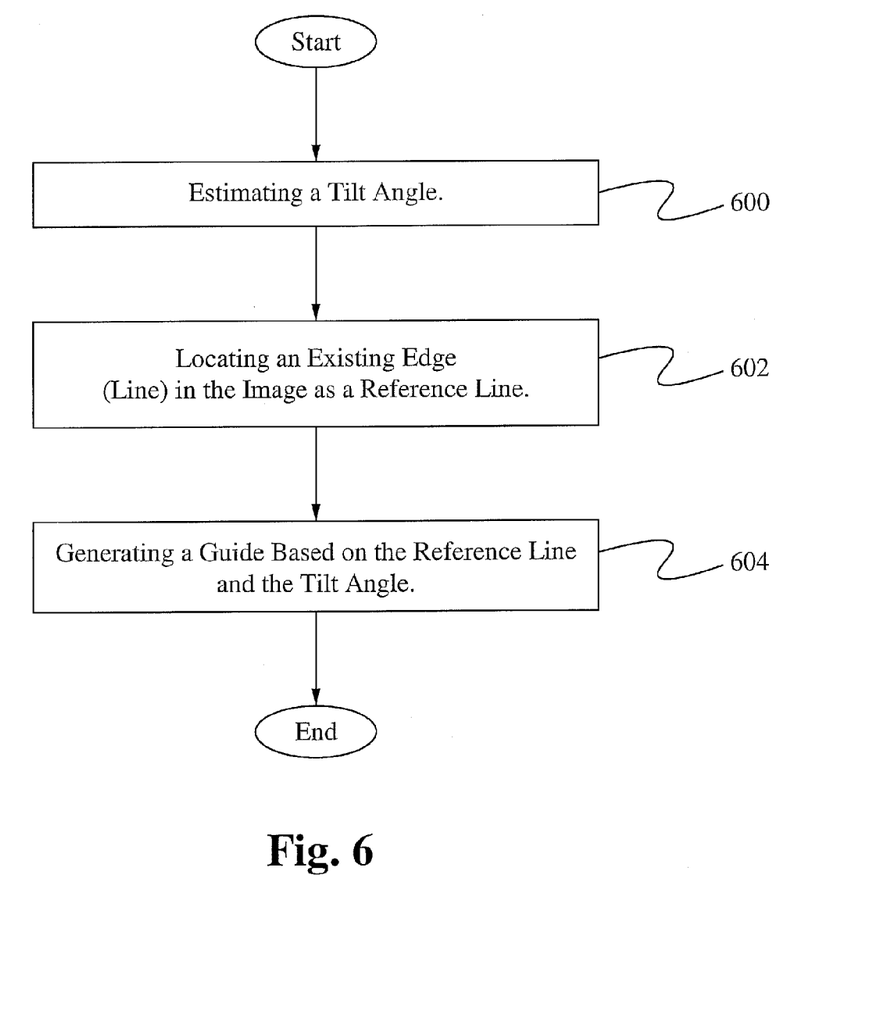
FIG. 6 illustrates a flowchart of a method of generating a reference line according to some embodiments.

FIG. 6 illustrates a flowchart of a method of generating a reference line according to some embodiments. In the step 600, a tilt angle of an image is estimated. The tilt angle is able to be estimated using any implementation such as tilt angle estimation described herein. In the step 602, an existing edge (line) is located in the image as a reference line. In the step 604, a guide (or new reference line) is generated based on the reference line and the estimated tilt angle. For example, a longer, stronger or clearer edge is located in the image. The new reference line is able to be used as a guide. When the new reference line is generated, the new reference line is displayed on a display so that the user is able to use the new reference line to adjust the image tilt so that the image appears in a desired orientation. The user is able to use any implementation to adjust the image tilt including, but not limited to, a button, a lever, a key, a touchpad/touchscreen and/or any other input implementation. For example, a user sees that the image is tilted based on the new reference line, and the user is able to press an auto-correct button to correct the tilt. In another example, a user recognizes the tilt based on the reference line and then presses a touchscreen icon to rotate the image n degrees (e.g. 1, 2 or any other amount) which is repeated until the tilt is corrected.

To utilize a reference line or virtual level, a user acquires an image such as by a digital camera, and then while the image is acquired or after the image is acquired, the image angle is able to be corrected using the reference line. For example, before/while an image is being acquired, the reference line is displayed, and the user is able to rotate the camera so that the image is acquired with a desired orientation, or after an image is acquired, a user is able to process the image and correct the tilt using the reference line. In some embodiments, the camera automatically implements the reference line, and in some embodiments, a user manually selects to implement the reference line. In some embodiments, the reference line is able to be implemented on another device such as a computer after the image is downloaded from the camera to the computer. On the computer, the reference line is able to be utilized manually or automatically. By using the reference line, the user is able to more easily recognize the appropriate positioning of the scene.

In operation, the reference line is able to be used to correct tilting of an image without object recognition. The tilt angle estimation computes a gradient feature, tracks line segments, estimates line segments and then estimates orientation deviation, which is then used to generate the reference line. The image is then able to be corrected based on the orientation deviation and the reference line. Using this process, an image is able to be corrected so that the image is configured appropriately without an undesired tilt. The tilt angle estimation and reference line are able to correctly compensate for a tilted image so that even if the image contains images that are leaning or angled, the correct configuration will still be obtained.

When taking a picture with a digital capturing device, the reference line is able to generate functionality similar to a hardware level. The image is analyzed to estimate a tilted angle deviated from a preferred angle (e.g. the user's intention). Then, an appropriate edge in the image is chosen as a reference line. A corrected reference line, based on the estimated tilted angle) is overlaid on the reference line of the image as a guide for the user. The user is then able to tilt the capturing device (e.g. camera) to match the edge (reference line) with the corrected reference line (guide), and then press the shutter for a well-balanced image.

In some embodiments, media able to utilize the method described herein includes but is not limited to images, videos and other data.

Embodiments of Reference Line Generation

1. A method of assisting a user in orienting an image programmed in a memory on a device comprising:
   a. estimating a tilt angle; and
   b. generating a reference line based on the tilt angle.

2. The method of clause 1 wherein estimating the tilt angle further comprises:
   a. computing a gradient feature;
   b. implementing line segment tracking;
   c. estimating a line segment; and
   d. estimating an orientation deviation.

3. The method of clause 2 wherein computing the gradient feature further comprises:
   a. estimating a gradient;
   b. adaptive noise filtering;
   c. non-maximum suppression; and
   d. thinning 4. The method of clause 2 wherein implementing line segment tracking further comprises:
   a. locating segment junctions using a neighborhood lookup table; and
   b. tracking edges between junction points.

5. The method of clause 4 wherein tracking edges between junction points further comprises:
   a. scanning a gradient image starting at a non-zero point;
   b. following an edge segment through its neighborhood;
   c. stopping tracking at a junction;
   d. assigning each segment a unique identification;
   e. iterating until all of the points are tracked; and
   f. removing any edge segment that is short or isolated.

6. The method of clause 2 wherein estimating the line segment further comprises:
   a. filtering edge length; and
   b. estimating linear segments from approximately vertical and horizontal lines.

7. The method of clause 2 wherein estimating the orientation deviation further comprises computing an optimal balance between deviations from all line segments.

8. The method of clause 2 wherein estimating the orientation deviation further comprises:
   a. image content analysis; and
   b. segment analysis.

9. The method of clause 8 wherein image content analysis further comprises filtering segments according to location in the image.

10. The method of clause 8 wherein segment analysis uses vertical segments if more than one vertical segment is present; otherwise, horizontal segments are used if more than one horizontal segment is present and the total length is more than the total vertical length; otherwise, the average of the vertical and horizontal segment length is used.

11. The method of clause 1 wherein generating the reference line includes displaying the reference line on a display of the device.

12. The method of clause 1 wherein generating the reference line occurs during image acquisition.

13. The method of clause 1 wherein generating the reference line occurs after image acquisition.

14. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

15. A method of assisting a user in orienting an image programmed in a memory on a device comprising:
    a. estimating a tilt angle comprising:
       i. implementing linear structure estimation;
       ii. estimating a planar structure; and
       iii. combining linear segments from the linear structure estimation and superpixels from estimating the planar structure for estimating orientation preference; and
    b. generating a reference line based on the tilt angle.

16. The method of clause 15 wherein implementing linear structure estimation further comprises:
   a. computing a gradient feature;
   b. implementing line segment tracking;
   c. estimating a line segment; and
   d. estimating an orientation deviation.
17. The method of clause 15 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.
18. A system programmed in a memory on a device comprising:
   a. a gradient feature module configured for computing a gradient feature;
   b. a line segment tracking module operatively coupled to the gradient feature module, the line segment tracking module configured for implementing line segment tracking;
   c. a line segment estimating module operatively coupled to the line segment tracking module, the line segment estimating module configured for estimating a line segment;
   d. an orientation deviation module operatively coupled to the line segment estimating module, the orientation deviation module configured for estimating an orientation deviation; and
   e. a reference line generation module operatively coupled to the orientation deviation module, the reference line generation module configured for generating a reference line based on the orientation deviation.
19. The system of clause 18 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.
20. A device comprising:
   a. a memory for storing an application, the application configured for:
      i. estimating a tilt angle; and
      ii. generating a reference line based on the tilt angle; and
   b. a processing component coupled to the memory, the processing component configured for processing the application.
21. The device of clause 20 wherein estimating the tilt angle further comprises:
   a. computing a gradient feature;
   b. implementing line segment tracking;
   c. estimating a line segment; and
   d. estimating an orientation deviation.
22. The device of clause 20 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.
23. A camera comprising:
   a. a lens;
   b. a sensor configured for acquiring an image through the lens;
   c. a memory for storing an application, the application configured for:
      i. estimating a tilt angle comprising:
         (1) computing a gradient feature;
         (2) implementing line segment tracking;
         (3) estimating a line segment; and
         (4) estimating an orientation deviation; and
      ii. generating a reference line based on the tilt angle; and
   d. a processing component coupled to the memory, the processing component configured for processing the application.
24. The camera of clause 23 wherein the reference line is displayed on a display to allow a user to correct tilt in the image.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of assisting a user in orienting an image programmed in a memory on a device comprising:
   a. estimating a tilt angle, wherein estimating the tilt angle further comprises:
      i. computing a gradient feature;
      ii. implementing line segment tracking;
      iii. estimating a line segment; and
      iv. estimating an orientation deviation; and
   b. generating a reference line based on the tilt angle.
2. The method of claim 1 wherein computing the gradient feature further comprises:
   a. estimating a gradient;
   b. adaptive noise filtering;
   c. non-maximum suppression; and
   d. thinning.
3. The method of claim 1 wherein implementing line segment tracking further comprises:
   tracking edges between junction points.
4. The method of claim 3 wherein tracking edges between junction points further comprises:
   a. scanning a gradient image starting at a non-zero point;
   b. following an edge segment through its neighborhood;
   c. stopping tracking at a junction;
   d. assigning each segment a unique identification;
   e. iterating until all of the points are tracked; and
   f. removing any edge segment that is short or isolated.
5. The method of claim 1 wherein estimating the line segment further comprises:
   a. filtering edge length; and
   b. estimating linear segments from approximately vertical and horizontal lines.
6. The method of claim 1 wherein estimating the orientation deviation further comprises computing an optimal balance between deviations from all line segments.
7. The method of claim 1 wherein estimating the orientation deviation further comprises:
   a. image content analysis; and
   b. segment analysis.
8. The method of claim 7 wherein image content analysis further comprises filtering segments according to location in the image.

9. The method of claim 7 wherein segment analysis uses vertical segments if more than one vertical segment is present; otherwise, horizontal segments are used if more than one horizontal segment is present and the total length is more than the total vertical length; otherwise, the average of the vertical and horizontal segment length is used.

10. The method of claim 1 wherein generating the reference line includes displaying the reference line on a display of the device.

11. The method of claim 1 wherein generating the reference line occurs during image acquisition.

12. The method of claim 1 wherein generating the reference line occurs after image acquisition.

13. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

14. A method of assisting a user in orienting an image programmed in a memory on a device comprising:
   a. estimating a tilt angle comprising:
      i. implementing linear structure estimation;
      ii. estimating a planar structure; and
      iii. combining linear segments from the linear structure estimation and superpixels from estimating the planar structure for estimating orientation preference; and
   b. generating a reference line based on the tilt angle.

15. The method of claim 14 wherein implementing linear structure estimation further comprises:
   a. computing a gradient feature;
   b. implementing line segment tracking;
   c. estimating a line segment; and
   d. estimating an orientation deviation.

16. The method of claim 14 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

17. A system programmed in a memory on a device comprising:
   a. a gradient feature module configured for computing a gradient feature;
   b. a line segment tracking module operatively coupled to the gradient feature module, the line segment tracking module configured for implementing line segment tracking;
   c. a line segment estimating module operatively coupled to the line segment tracking module, the line segment estimating module configured for estimating a line segment;
   d. an orientation deviation module operatively coupled to the line segment estimating module, the orientation deviation module configured for estimating an orientation deviation; and
   e. a reference line generation module operatively coupled to the orientation deviation module, the reference line generation module configured for generating a reference line based on the orientation deviation.

18. The system of claim 17 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

19. A device comprising:
   a. a memory for storing an application, the application configured for:
      i. estimating a tilt angle, wherein estimating the tilt angle further comprises:
         (1) computing a gradient feature;
         (2) implementing line segment tracking;
         (3) estimating a line segment; and
         (4) estimating an orientation deviation; and
      ii. generating a reference line based on the tilt angle; and
   b. a processing component coupled to the memory, the processing component configured for processing the application.

20. The device of claim 19 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

21. A camera comprising:
   a. a lens;
   b. a sensor configured for acquiring an image through the lens;
   c. a memory for storing an application, the application configured for:
      i. estimating a tilt angle comprising:
         (1) computing a gradient feature;
         (2) implementing line segment tracking;
         (3) estimating a line segment; and
         (4) estimating an orientation deviation; and
      ii. generating a reference line based on the tilt angle; and
   d. a processing component coupled to the memory, the processing component configured for processing the application.

22. The camera of claim 21 wherein the reference line is displayed on a display to allow a user to correct tilt in the image.

* * * * *